US009195651B2

United States Patent
Luo et al.

(10) Patent No.: US 9,195,651 B2
(45) Date of Patent: Nov. 24, 2015

(54) TECHNIQUES FOR LANGUAGE TRANSLATION LOCALIZATION FOR COMPUTER APPLICATIONS

(71) Applicant: Google Inc., Mountain View, CA (US)

(72) Inventors: Yongping Luo, Mountain View, CA (US); Chenjun Wu, Mountain View, CA (US)

(73) Assignee: Google Inc., Mountain View, CA (US)

(*) Notice: Subject to any disclaimer, the term of this patent is extended or adjusted under 35 U.S.C. 154(b) by 251 days.

(21) Appl. No.: 13/838,623

(22) Filed: Mar. 15, 2013

(65) Prior Publication Data

US 2014/0278347 A1      Sep. 18, 2014

(51) Int. Cl.
*G06F 17/28*      (2006.01)
*G06F 9/44*       (2006.01)

(52) U.S. Cl.
CPC .......... *G06F 17/2836* (2013.01); *G06F 9/4448* (2013.01); *G06F 17/28* (2013.01); *G06F 17/289* (2013.01)

(58) Field of Classification Search
CPC ................................................ G06F 17/2836
USPC ....................................................... 704/1, 8
See application file for complete search history.

(56) References Cited

U.S. PATENT DOCUMENTS

| | | | | |
|---|---|---|---|---|
| 5,903,859 | A * | 5/1999 | Stone et al. | 704/8 |
| 2002/0162093 | A1 * | 10/2002 | Zhou et al. | 717/130 |
| 2006/0130006 | A1 * | 6/2006 | Chitale | 717/136 |
| 2008/0127045 | A1 | 5/2008 | Pratt et al. | |
| 2009/0037830 | A1 | 2/2009 | Kulkarni et al. | |
| 2009/0112577 | A1 * | 4/2009 | Gifford et al. | 704/9 |
| 2009/0271176 | A1 * | 10/2009 | Bodin et al. | 704/2 |
| 2012/0185236 | A1 * | 7/2012 | Blodgett et al. | 704/2 |

FOREIGN PATENT DOCUMENTS

EP        1100004 A       5/2001

OTHER PUBLICATIONS

PCT International Search Report and Written Opinion dated Jul. 8, 2014 for PCT International Application No. PCT/US2014/023170, 10 pages.

* cited by examiner

*Primary Examiner* — Douglas Godbold
(74) *Attorney, Agent, or Firm* — Remarck Law Group PLC (57) ABSTRACT

A computer-implemented technique includes receiving, at a server, a source code for a computer application executable by a computing device. The server extracts one or more translatable messages in a source language from the source code. The server inserts a hidden unique identifier for each of the one or more translatable messages to obtain a first modified source code, wherein each specific hidden unique identifier is operable to identify a corresponding specific translatable message during execution of the first modified source code by the computing device. The server transmits the first modified source code to the computing device. The server receives one or more translated messages from the computing device, the one or more translated messages being in a target language and having been input at the computing device in response to execution of the first modified source code. The server then outputs the one or more translated messages.

22 Claims, 4 Drawing Sheets

TECHNIQUES FOR LANGUAGE TRANSLATION LOCALIZATION FOR COMPUTER APPLICATIONS

FIELD

The present disclosure relates to language translation and, more particularly, to techniques for language translation localization for computer applications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computer applications can refer to any software executable by a processor of a computing device. Each computer application is associated with a source code. The source code can be written in a computing language that can be interpreted and executed by the processor of the computing device. The source code can be developed by a programmer and can then be distributed to one or more users by the programmer or by a vendor.

SUMMARY

A computer-implemented technique is presented. The technique can include receiving, at a server including one or more processors, a source code for a computer application executable by a computing device. The technique can include extracting, at the server, one or more translatable messages from the source code, each of the one or more translatable messages being in a source language and being translatable to a target language. The technique can include inserting, at the server, a hidden unique identifier for each of the one or more translatable messages to obtain a first modified source code, wherein each specific hidden unique identifier is operable to identify a corresponding specific translatable message during execution of the first modified source code by the computing device. The technique can include transmitting, from the server, the first modified source code to the computing device. The technique can include receiving, at the server, one or more translated messages from the computing device, the one or more translated messages being in the target language and having been input at the computing device in response to executing the first modified source code at the computing device. The technique can also include outputting, from the server, the one or more translated messages.

In some embodiments, the computer application is a web-based computer application executable in a web browser executing at the computing device, and the computer-implemented technique is implemented via an extension or a plug-in for the web browser.

In other embodiments, the one or more translatable messages include text strings in the source code.

In some embodiments, the one or more translatable messages include text strings that are not in the source code and are dynamically generated by the computer application during execution of the source code.

In other embodiments, the one or more translated messages are based on input at the computing device by a human translator capable of translating text from the source language to the target language, and the one or more translated messages are received at the server from the computing device via a JavaScript.

In some embodiments, each specific hidden unique identifier is operable to allow the human translator to select a specific translatable message.

In other embodiments, each specific hidden unique identifier is operable to highlight the specific translatable message in the computer application during the executing of the first modified source code.

In some embodiments, outputting the one or more translated messages further includes: automatically obtaining, at the server, a second modified source code by replacing the one or more translatable messages with the one or more translated messages, respectively, and outputting, from the server, the second modified source code.

In other embodiments, outputting the one or more translated messages includes outputting, from the server, the one or more translated messages to a vendor or a programmer associated with the computer application.

In some embodiments, the technique further includes receiving, at the server, a second modified source code from the vendor or the programmer associated with the computer application, wherein the second modified source code includes the one or more translated messages in place of the one or more translatable messages, respectively.

A server is also presented. The server can include a communication device and one or more processors. The communication device can be configured to receive a source code for a computer application executable by a computing device. The one or more processors can be configured to extract one or more translatable messages from the source code, each of the one or more translatable messages being in a source language and being translatable to a target language. The one or more processors can also be configured to insert a hidden unique identifier for each of the one or more translatable messages to obtain a first modified source code, wherein each specific hidden unique identifier is operable to identify a corresponding specific translatable message during execution of the first modified source code by the computing device. The communication device can be further configured to transmit the first modified source code to the computing device. The communication device can be further configured to receive one or more translated messages from the computing device, the one or more translated messages being in the target language and having been input at the computing device in response to executing the first modified source code at the computing device. The communication device can also be further configured to output the one or more translated messages.

In some embodiments, the computer application is a web-based computer application executable in a web browser executing at the computing device, and the communication device is configured to interact with an extension or a plug-in for the web browser.

In other embodiments, the one or more translatable messages include text strings in the source code In some embodiments, the one or more translatable messages include text strings that are not in the source code and are dynamically generated by the computer application during execution of the source code.

In other embodiments, the one or more translated messages are based on input at the computing device by a human translator capable of translating text from the source language to the target language, and the one or more translated messages are received at the server from the computing device via a JavaScript.

In some embodiments, each specific hidden unique identifier is operable to allow the human translator to select a specific translatable message.

In other embodiments, each specific hidden unique identifier is operable to highlight the specific translatable message in the computer application during the executing of the first modified source code.

In some embodiments, the one or more processors are further configured to automatically obtain a second modified source code by replacing the one or more translatable messages with the one or more translated messages, respectively, and the communication device is configured to output the one or more translated messages by outputting the second modified source code.

In other embodiments, the communication device is configured to output the one or more translated messages by outputting the one or more translated messages to a vendor or a programmer associated with the computer application.

In some embodiments, the communication device is further configured to receive a second modified source code from the vendor or the programmer associated with the computer application, wherein the second modified source code includes the one or more translated messages in place of the one or more translatable messages, respectively.

A non-transitory computer-readable medium is also presented. The computer-readable medium can have instructions stored thereon that, when executed by one or more processors of a server, cause the server to perform operations. The operations can include receiving a source code for a computer application executable by a computing device. The operations can include extracting one or more translatable messages from the source code, each of the one or more translatable messages being in a source language and being translatable to a target language. The operations can include inserting a hidden unique identifier for each of the one or more translatable messages to obtain a first modified source code, wherein each specific hidden unique identifier is operable to identify a corresponding specific translatable message during execution of the first modified source code by the computing device. The operations can include transmitting the first modified source code to the computing device. The operations can include receiving one or more translated messages from the computing device, the one or more translated messages being in the target language and having been input at the computing device in response to executing the first modified source code at the computing device. The operations can also include outputting the one or more translated messages.

In some embodiments, the computer application is a web-based computer application executable in a web browser executing at the computing device, and the instructions are executable by the one or more processors via an extension or a plug-in for the web browser.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Given the worldwide reach of the Internet, users of computer applications may speak and/or understand different languages. A programmer that develops a source code for a specific computer application, however, may only develop the source code with respect to a particular source language, e.g., English. Some users, therefore, may be unable to understand portions of the specific computer application. In particular, user interfaces generated and output during execution of the specific computer application may include one or more messages that are in the source language, which may not be understandable by some users. These users may desire that the one or more messages be translated to a target language that is different than the source language. Language translation can be performed either by a computing device (machine translation) or by a human translator (manual translation). Manual translation may be preferred over machine translation because manual translation is typically more accurate.

Human translators, however, may be unable to understand portions of the source code and, more importantly, these human translators may be unable to discern the context of the one or more messages. Moreover, it can be difficult for the programmer to add information to the source code to assist the human translators. Additionally, there is not necessarily a direct mapping between the messages in the executing application and the messages in the source code. Rather, a single message in the source code may appear more than once during the execution of the computer application. Some of the messages may also be generated dynamically during the execution of the computer application and, therefore, the human translators will be unable to translate these messages without executing the computer application themselves. Screenshots could be provided to the human translator, but this requires time and computing resources and still may fail to capture the context. Further, not all of these possible dynamic messages may be output during the human translators' execution of the computer application.

Accordingly, techniques are presented for language translation localization for computer applications. According to these techniques, a server can receive a source code for a computer application and can extract one or more translatable messages from the source code. For example, the computer application may be a web-based application executable in a web browser of a computing device. Each of the translatable messages can be in a source language, e.g., English, and can be translatable to a target language, e.g., Spanish. A hidden unique identifier can then be inserted into the source code for each of the one or more translatable messages to obtain a first modified source code. Each specific hidden unique identifier can be operable to identify a corresponding one of the one or more translatable messages to a user of the computer application. The first modified source code can then be provided from the server to a computing device associated with a human translator.

The human translator can provide one or more translated messages in the target language, which correspond to the one or more translatable messages in the source language, respectively, during execution of the first modified source code. The one or more translatable messages can then be returned to the server. The server can then automatically replace the one or more translatable messages with the one or more translated messages to obtain a second modified source code, or the server can provide the one or more translatable messages to a programmer/vendor associated with the computer application, who can manually replace the one or more translatable messages with the one or more translated messages to obtain the second modified source code. The second modified source code can then be provided to users that desire the computer application and speak/understand the target language.

The techniques of the present disclosure can be implemented at any server or other computing device provided that the server or other the computing device can implement a message application programming interface (API) (also referred to as a message API server) according to the present disclosure, which is described in detail later. This server or the other computing device can then be shared and thus can be used by different users for language translation localization for different computer applications. In addition, the end user (the human translator or any other suitable user) only needs to execute an extension or a plug-in (or other suitable software) to interact with the message API. Alternatively, without the extension or plug-in, the computer application could have a JavaScript call to the message API and thus could provide the same functionality. In the case of a web-based computer application, however, the extension or plug-in may be easily integrated.

Figure 1:
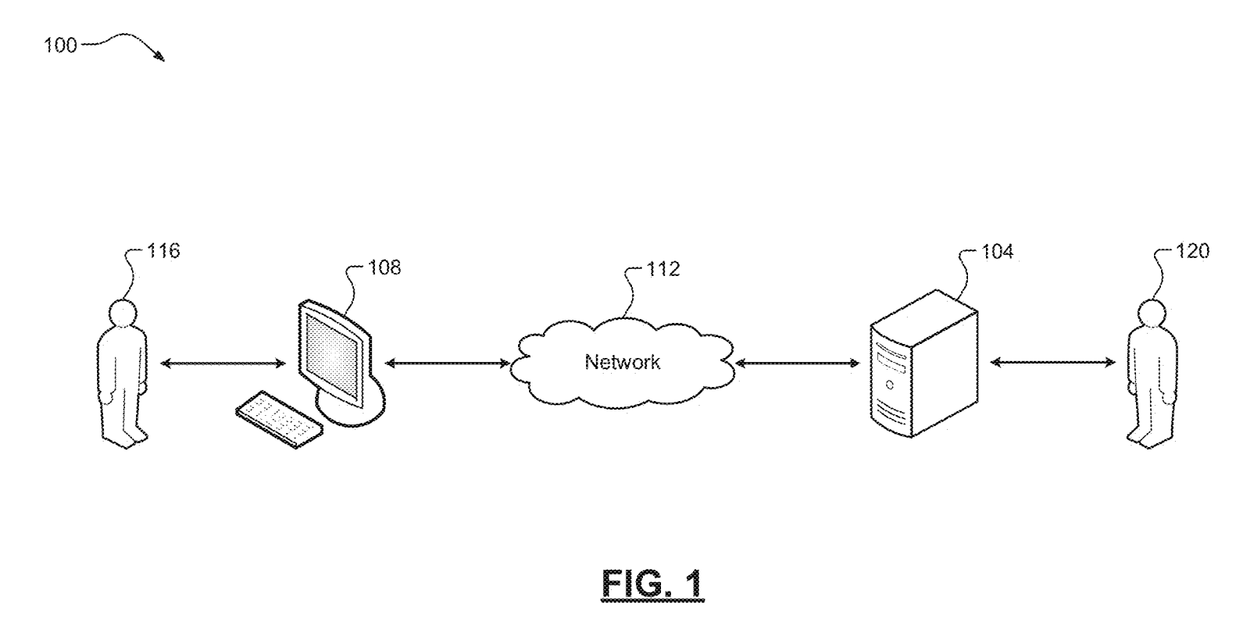
FIG. 1 depicts a computing network including an example server according to some implementations of the present disclosure.

Referring now to FIG. 1, a computing network 100 is illustrated. The computing network 100 can include an example server 104 according to some implementations of the present disclosure. The server 104 can communicate with at least one computing device 108 via a network 112. The server 104 can be any suitable computing device including one or more processors that is configured to implement the techniques according to some implementations of the present disclosure. It should be appreciated that while a single server 104 is illustrated, the computing network 100 can include two or more servers operating in a parallel or distributed architecture that can collectively implement the techniques according to some implementations of the present disclosure. The network 112 can include a local area network (LAN), a wide area network (WAN), e.g., the Internet, or a combination thereof.

A human translator 116 can operate the computing device 108. It should be appreciated that the term "human translator" as used herein can refer to any user capable of translation from a source language, e.g., English, to a target language, e.g., Spanish, and thus may include both professional translators and users having limited or no experience in translation from the source language to the target language. The computing device 108 can be any suitable computing device (a desktop computer, a laptop computer, a tablet computer, a mobile phone, etc.). It should be appreciated that while a single computing device 108 and a single human translator 116 are shown, the computing network 100 can include two or more computing devices and two or more human translators that can collectively participate in the techniques according to some implementations of the present disclosure. In addition, it should be appreciated that two or more human translators can operate a single computing device. Additionally, a programmer/vendor 120 can interact with the server 104 to provide a source code and, in some cases, to receive translated message(s) and return a modified source code corresponding to the target language to the server 104.

Figure 2:
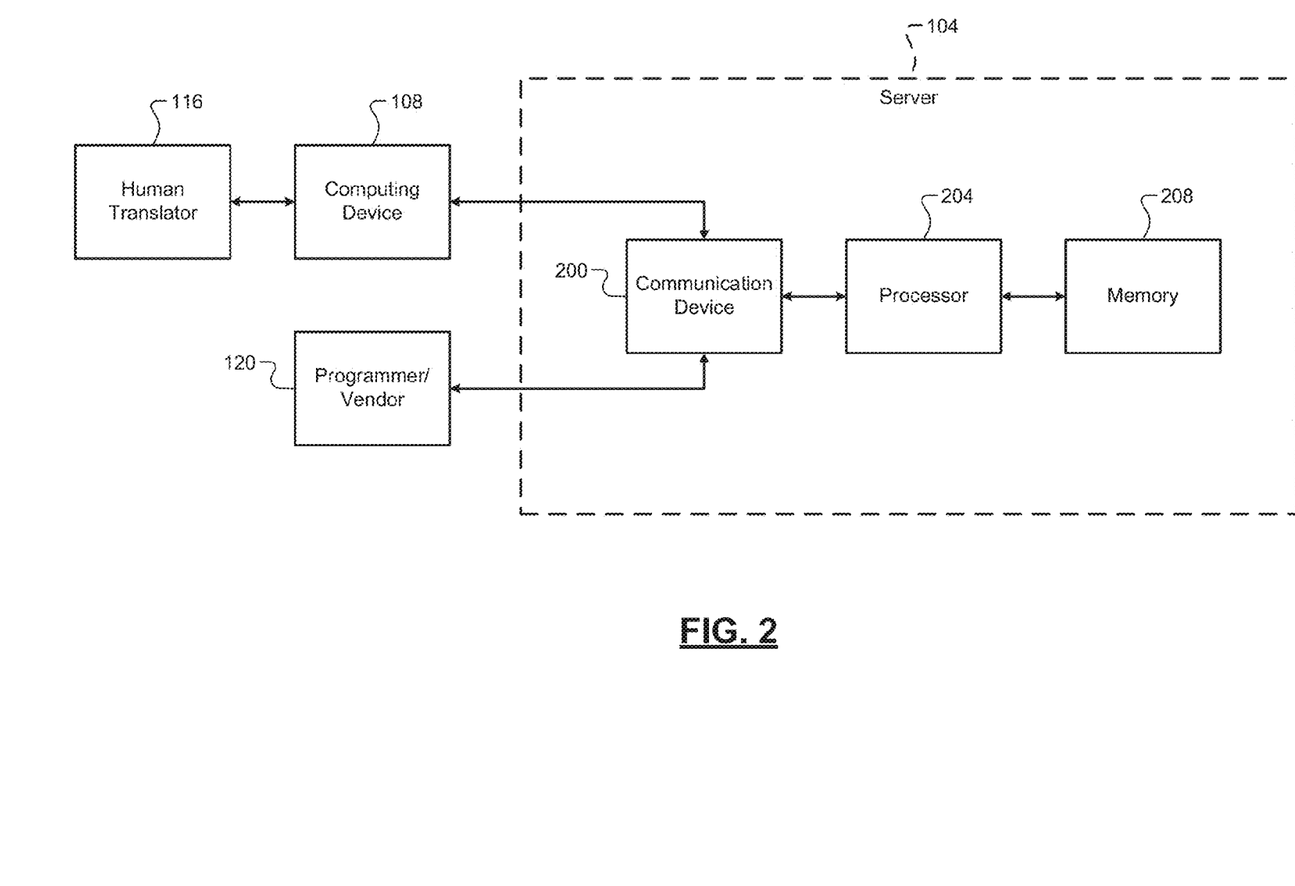
FIG. 2 depicts an example functional block diagram of the server of FIG. 1.

Referring now to FIG. 2, an example functional block diagram of the server 104 is illustrated. The server 104 can include a communication device 200, a processor 204, and a memory 208. It should be appreciated that the server 104 can also include other suitable computing components, such as a user interface. It should also be appreciated that the example functional block diagram of the server 104 can be implemented in any suitable computing device, such as computing device 108.

The communication device 200 can control communication between the server 104 and other computing devices, e.g., computing device 108, and/or a user, e.g., the programmer or the vendor 120. The communication device 200 can be configured for communication via any of the network 112, short range wireless communication mediums (Bluetooth, WiFi Direct, etc.), and direct user communication, e.g., via a user interface. The communication device 200 can include any suitable components for communication with other computing devices and/or the user, such as a transceiver. The communication device 200 can also be configured to execute a portion of the techniques according to some implementations of the present disclosure, which is described in detail below.

The processor 204 can control operation of the server 104. The processor 104 can perform functions including, but not limited to launching/executing an operating system of the server 104, controlling communication by the server 104 via the communication device 200, and/or controlling read/write operations at the memory 208. It should be appreciated that the term "processor" as used herein can refer to both a single processor and two or more processors operating in a parallel or distributed architecture. The memory 208 can be any suitable storage medium configured to store information at the server 104 (flash, hard disk, etc.). For example, the memory 208 can store the source code and the first modified source code for the computer application and, in some cases, the second modified source code for the computer application. The processor 204 can also execute a portion of the techniques according to some implementations of the present disclosure, which is described in detail below.

According to the techniques of the present disclosure, the communication device 200 can receive a source code for a computer application. In some implementations, the computer application is a web-based computer application executable in a web browser executing at a computing device. In such implementations, a portion of the techniques of the present disclosure can be implemented via an extension or a plug-in for the web browser. The communication device 200 can receive the source code from a programmer, such as the programmer/vendor 120. The source code can include one or more translatable messages and can be written by the programmer/vendor 120 in a particular programming language. For example, the programming language can be JavaScript, Hierarchical Data Format (HDF), Closure Template (Soy) files, or another suitable programming language. Each of the one or more translatable messages can be in a source language, e.g., English, and can be translatable to a target language, e.g., Spanish.

The processor 204 can extract the one or more translatable messages from the source code. The one or more translatable messages can include text strings in the source code and/or text strings that are dynamically generated by the computer application during execution of the source code but that are not actually in the source code itself. The processor 204 can insert a hidden unique identifier for each of the one or more translatable messages to obtain a first modified source code. For example, the each hidden unique identifier can be a zero-width character or characters that do not appear when the corresponding message is displayed in the computer application. It should be appreciated that two or more hidden unique identifiers could also be inserted for each translatable message, e.g., at a beginning and at an end. A specific hidden unique identifier can be operable to identify (or allow the human translator to identify) a specific translatable message during execution of the first modified source code by the computing device. For example, the hidden unique identifiers can be operable to allow the user to highlight a particular translatable message in order to obtain details for that message.

The communication device 200 can transmit the first modified source code to the computing device 108. The communication device 200 can then receive one or more translated messages from the computing device 108. For example, the one or more translated messages can be received at the communication device 200 using JavaScript. The one or more translated messages can be in the target language and can be input at the computing device 108, e.g., by the human translator 116, in response to executing the first modified source code at the computing device 108. More specifically, the one or more translated messages are based on input at the computing device 108 by the human translator 116, who is capable of translating text from the source language to the target language.

The communication device 200 can also output the one or more translated messages. In some implementations, the outputting of the one or more translated messages can include the processor 204 automatically obtaining a second modified source code by replacing the one or more translatable messages with the one or more translated messages. After the processor 204 obtains the second modified source code, the communication device 200 can then output the second modified source code, e.g., to the computing device 108 or another user's computing device. In other implementations, the outputting of the one or more translated messages can include the communication device 200 outputting the one or more translated messages to the programmer/vendor 120 and then receiving the second modified source code from the programmer/vendor 120.

Figure 3:
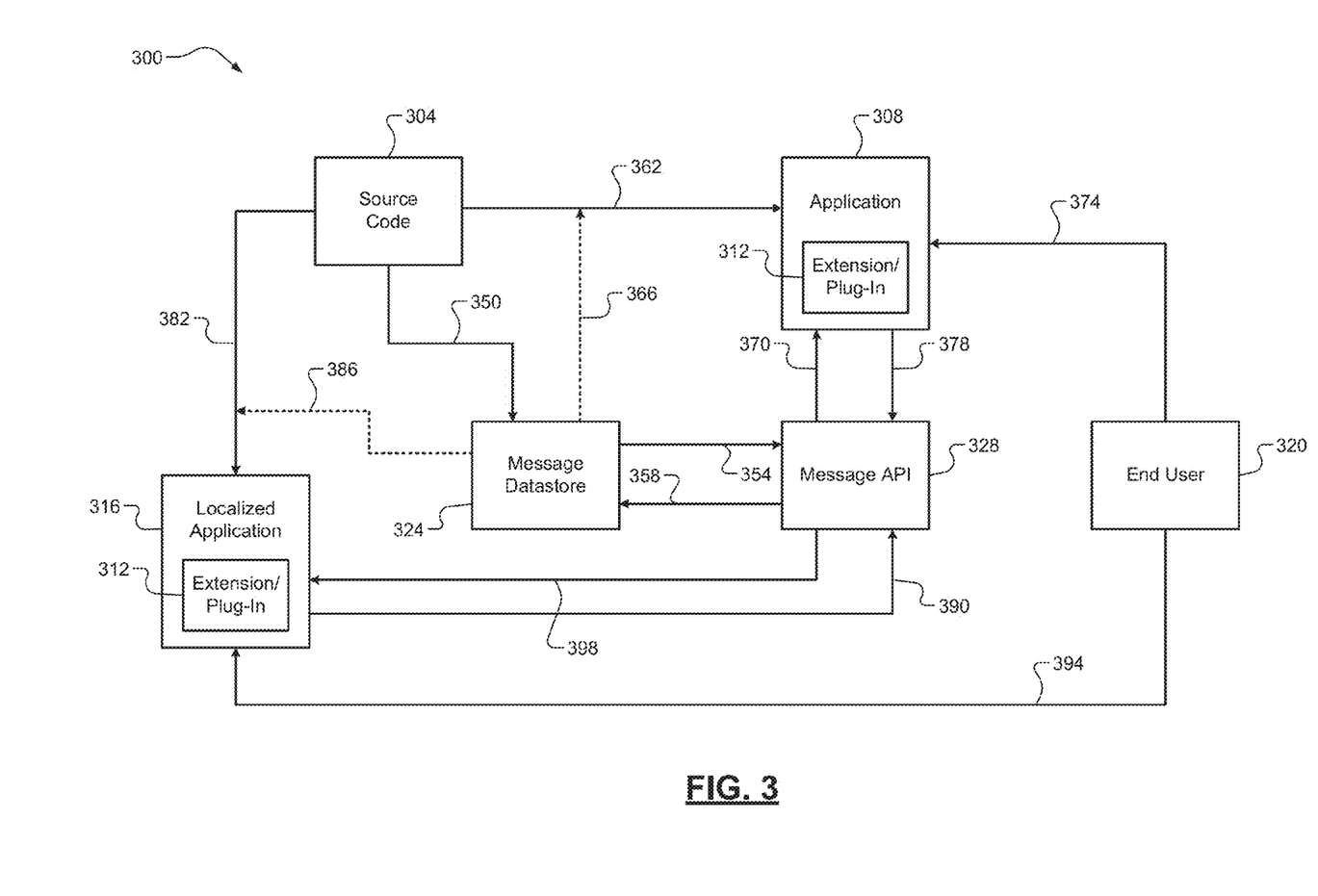
FIG. 3 depicts an example workflow diagram for a technique for language translation localization for computer applications according to some implementations of the present disclosure.

Referring now to FIG. 3, an example workflow diagram ("workflow") 300 for a technique for translation localization for computer applications according to some implementations of the present disclosure is illustrated. The workflow 300 illustrates various items 304-328 and their specific interactions 350-398. The items can include a source code 304, an application 308, an extension/plug-in 312 associated with the application 308, a localized application 316 (also having the associated extension/plugin 312), an end user 320, a message datastore 324, and a message API 328 (also referred to as a message API server). It should be appreciated that any of these items, particularly the message datastore 324 and the message API 328, can be implemented at the server 104. It should also be appreciated that the end user 320 can be the human translator 116.

To begin the workflow 300, the source code 304 can be provided by a programmer. For example, the programmer can be the programmer/vendor 120. The source code 304 can include one or more translatable messages and can be written in a particular programming language (JavaScript, HDF, Soy files, etc.). It should be appreciated that the source code 304 may be written other suitable programming languages. The source code 304 can include a unique index for each of the one or more translatable messages, respectively. For example, the unique index can be a sequential identifier (1, 2, 3, etc.) assigned to the one or more translatable messages in an order in which they appear in the source code 304.

A first interaction 350 illustrates the extraction of the one or more translatable messages from the source code 304. The one or more translatable messages can be stored at the message datastore 324, each of the one or more translatable messages having their corresponding unique index. A second interaction 354 illustrates a request from the message datastore 324 for details for the one or more translatable messages from the message API 328. A third interaction 358 illustrates a response to this request by the message API 328 include the details for the one or more translatable messages. For example, the details can include translations and/or suggested translations. These details (translations, suggested translations, etc.) are used later in the workflow 300. A fourth interaction 362 illustrates generation of the application 308 with the extension/plug-in 312.

A fifth interaction 366, which is illustrated as part of the fourth interaction 362, illustrates the message datastore 324 providing the one or more translatable messages encoded with their unique indices and with the hidden unique identifiers, e.g., zero-width invisible characters, which can also be referred to as "decorated messages." These hidden unique identifiers do not affect the one or more translatable messages as they are displayed via the application 308. Also during the fourth interaction 362, each of the one or more translatable messages can be marked at its beginning and/or at its end with its corresponding hidden unique identifier. Additionally, the unique index for the each of the one or more translatable messages can be encoded in the message itself. To complete the fourth interaction 362, the application 308 can be generated with the decorated messages having their beginning and end hidden unique identifiers and their encoded indices.

A sixth interaction 370 illustrates the extension/plug-in 312 of the application 308 retrieving message details, including placeholders used in the messages, from the message API 328. The sixth interaction 370 can be performed in response to the end user 320 selecting, e.g., highlighting, a portion of text displayed in the application 308 using the extension/plug-in 312. The extension/plug-in 312 can then identify the message using its embedded unique index, and can then retrieve its corresponding details. A seventh interaction 374 illustrates the end user 320 providing a translation of the message from its source language to a target language. An eighth interaction 378 illustrates the extension/plug-in 312 of the application 308 sending the translation to the message API. The translation can be attached to its correct original message using the unique index.

A ninth interaction 382 illustrates the generation of the localized application 316 with the extension/plug-in 312. For example, the localized application 316 with the extension/plug-in 312 can be generated at the computing device 108. A tenth interaction 386, which is illustrated as part of the ninth interaction 382, illustrates the message datastore 324 providing the one or more translated messages with their unique hidden identifiers, which can also be referred to as "decorated translations." As previously mentioned, these hidden unique identifiers do not affect the one or more translated messages as they are displayed via the localized application 316. Similar to the one or more translatable messages, the one or more translated messages can also be encoded with their respective unique indices.

Eleventh, twelfth, and thirteenth interactions 390, 394, and 398 can be optional. These interactions illustrate the collection of feedback and suggested translations from the end user 320. In this scenario, the end user 320 may be a different user than the human translator 116. The eleventh interaction 390 illustrates the extension/plug-in 312 of the localized application 316 retrieving translated message details from the message API 328. The eleventh interaction 390 can be performed in response to the end user 320 selecting, e.g., highlighting, a portion of text displayed in the localized application 316 using the extension/plug-in 312. The extension/plug-in 312 can then identify the translated message using its embedded unique index, and can then retrieve its corresponding details.

The twelfth interaction 394 illustrates the end user 320 suggesting a better translation of the original message than the current translated message. It should be appreciated that the input by the end user 320 is subjective and therefore may not always be a better translation of the original message. After accumulation of a large amount of end user input, however, poor suggestions can be filtered out or ignored. The thirteenth and last interaction 398 illustrates the extension/plug-in 312 of the localized application 316 sending the suggested translation back to the message API 328. The suggested translation can be attached to its correct translated message and/or original message using the unique message index.

Figure 4:
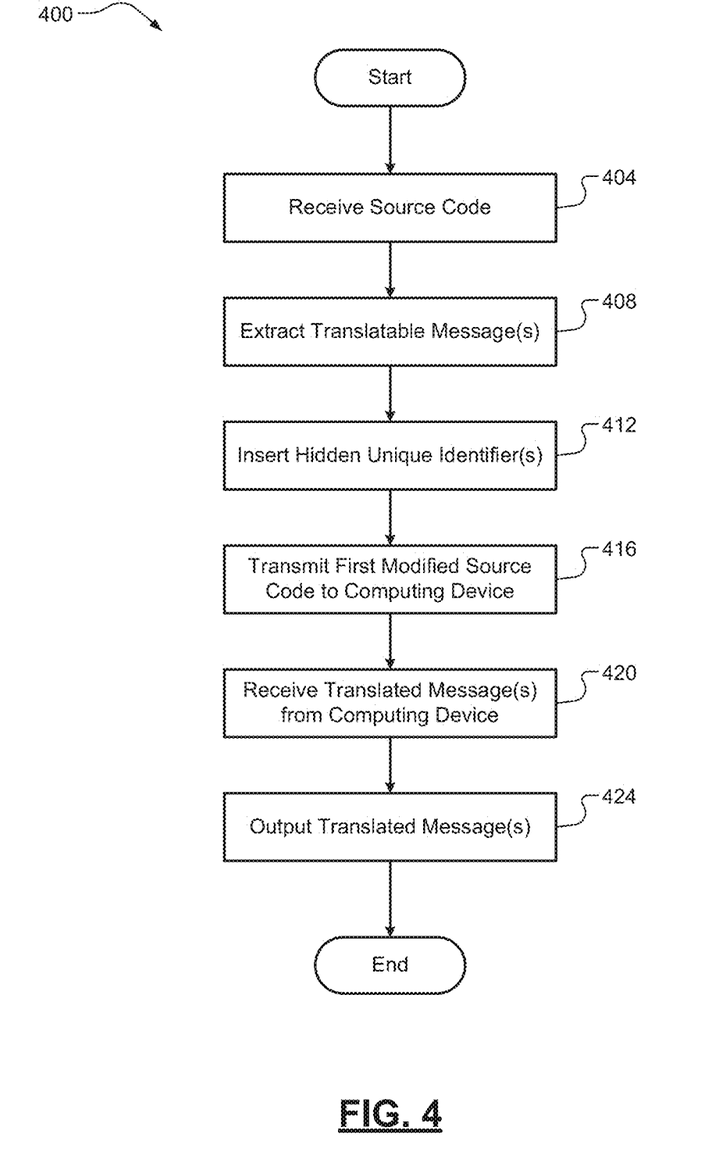
FIG. 4 depicts an example flow diagram of a technique for language translation localization for computer applications according to some implementations of the present disclosure.

Referring now to FIG. 4, an example flow diagram 400 for a technique for translation localization for computer applications according to some implementations of the present disclosure is illustrated. At 404, the server 104 can receive the source code for a computer application executable by the computing device 108. For example, the source code may be provided to the server from the programmer/vendor 120. At 408, the server 104 can extract one or more translatable messages from the source code. Each of the one or more translatable messages can be in a source language and can be translatable to a target language. At 412, the server 104 can insert a hidden unique identifier for each of the one or more translatable messages to obtain a first modified source code. A specific hidden unique identifier can be operable to identify a specific translatable message during execution of the first modified source code by the computing device 108.

At 416, the server 104 can transmit the first modified source code to the computing device 108, e.g., via the network 112. At 420, the server 104 can receive one or more translated messages from the computing device 108. The one or more translated messages can be in the target language and can be input at the computing device 108, e.g., by the human translator 116, in response to executing the first modified source code at the computing device 108. At 424, the server 104 can output the one or more translated messages. For example, the server 104 can automatically obtain and then output a second modified source code by replacing the one or more translatable messages with the one or more translated messages, respectively, or the server 104 can provide the one or more translated messages to the programmer/vendor 120, who can then obtain the second modified source code. The technique can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art.

These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a server including one or more processors, a source code for a computer application executable by a computing device;
   extracting, at the server, one or more translatable messages from the source code, each of the one or more translatable messages being in a source language and being translatable to a target language;
   inserting, at the server, a hidden unique identifier for each of the one or more translatable messages to obtain a first modified source code for the computer application, wherein each specific hidden unique identifier is operable to identify a corresponding specific translatable message during execution of the computer application;
   transmitting, from the server, the first modified source code to the computing device, wherein receipt of the first modified source code causes the computing device to execute the computer application;
   receiving, at the server, one or more translated messages from the computing device, the one or more translated messages being in the target language and having been input by a human translator at the computing device during the execution of the computer application; and
   outputting, from the server, the one or more translated messages.

2. The computer-implemented method of claim 1, wherein the computer application is a web-based computer application executable in a web browser executing at the computing device, and wherein the computer-implemented method is implemented via an extension or a plug-in for the web browser.

3. The computer-implemented method of claim 1, wherein the one or more translatable messages include text strings in the source code.

4. The computer-implemented method of claim 1, wherein the one or more translatable messages include text strings that are not in the source code and are dynamically generated by the computer application during execution of the source code.

5. The computer-implemented method of claim 1, wherein the one or more translated messages are received at the server from the computing device via a JavaScript.

6. The computer-implemented method of claim 1, wherein each specific hidden unique identifier is operable to allow the human translator to select a specific translatable message during the execution of the computer application at the computing device.

7. The computer-implemented method of claim 6, wherein each specific hidden unique identifier is operable to highlight the specific translatable message in the computer application during its execution.

8. The computer-implemented method of claim 1, wherein outputting the one or more translated messages further includes:
   automatically obtaining, at the server, a second modified source code by replacing the one or more translatable messages with the one or more translated messages, respectively; and
   outputting, from the server, the second modified source code.

9. The computer-implemented method of claim 1, wherein outputting the one or more translated messages includes outputting, from the server, the one or more translated messages to a vendor or a programmer associated with the computer application.

10. The computer-implemented method of claim 9, further comprising receiving, at the server, a second modified source code from the vendor or the programmer associated with the computer application, wherein the second modified source code includes the one or more translated messages in place of the one or more translatable messages, respectively.

11. A server, comprising:
a communication device configured to receive a source code for a computer application executable by a computing device; and
one or more processors configured to:
extract one or more translatable messages from the source code, each of the one or more translatable messages being in a source language and being translatable to a target language, and
insert a hidden unique identifier for each of the one or more translatable messages to obtain a first modified source code for the computer application, wherein each specific hidden unique identifier is operable to identify a corresponding specific translatable message during execution of the computer application,
wherein the communication device is further configured to:
transmit the first modified source code to the computing device, wherein receipt of the first modified source code causes the computing device to execute the computer application,
receive one or more translated messages from the computing device, the one or more translated messages being in the target language and having been input by a human translator at the computing device during the execution of the computer application, and
output the one or more translated messages.

12. The server of claim 11, wherein the computer application is a web-based computer application executable in a web browser executing at the computing device, and wherein the communication device is configured to interact with an extension or a plug-in for the web browser.

13. The server of claim 11, wherein the one or more translatable messages include text strings in the source code.

14. The server of claim 11, wherein the one or more translatable messages include text strings that are not in the source code and are dynamically generated by the computer application during execution of the source code.

15. The server of claim 11, wherein the one or more translated messages are received at the server from the computing device via a JavaScript.

16. The server of claim 11, wherein each specific hidden unique identifier is operable to allow the human translator to select a specific translatable message during the execution of the computer application at the computing device.

17. The server of claim 16, wherein each specific hidden unique identifier is operable to highlight the specific translatable message in the computer application during its execution.

18. The server of claim 11, wherein the one or more processors are further configured to automatically obtain a second modified source code by replacing the one or more translatable messages with the one or more translated messages, respectively, and wherein the communication device is configured to output the one or more translated messages by outputting the second modified source code.

19. The server of claim 11, wherein the communication device is configured to output the one or more translated messages by outputting the one or more translated messages to a vendor or a programmer associated with the computer application.

20. The server of claim 19, wherein the communication device is further configured to receive a second modified source code from the vendor or the programmer associated with the computer application, wherein the second modified source code includes the one or more translated messages in place of the one or more translatable messages, respectively.

21. A non-transitory computer-readable medium having instructions stored thereon that, when executed by one or more processors of a server, cause the server to perform operations comprising:
receiving a source code for a computer application executable by a computing device;
extracting one or more translatable messages from the source code, each of the one or more translatable messages being in a source language and being translatable to a target language;
inserting a hidden unique identifier for each of the one or more translatable messages to obtain a first modified source code for the computer application, wherein each specific hidden unique identifier is operable to identify a corresponding specific translatable message during execution of the first modified source code by the computing device;
transmitting the first modified source code to the computing device, wherein receipt of the first modified source code causes the computing device to execute the computer application;
receiving one or more translated messages from the computing device, the one or more translated messages being in the target language and having been input by a human translator at the computing device during the execution of the computer application; and
outputting the one or more translated messages.

22. The computer-readable medium of claim 21, wherein the computer application is a web-based computer application executable in a web browser executing at the computing device, and wherein the instructions are executable by the one or more processors via an extension or a plug-in for the web browser.

* * * * *